(12) United States Patent
Ketcham et al.

(10) Patent No.: US 8,561,287 B2
(45) Date of Patent: Oct. 22, 2013

(54) UNDER VESSEL LOCAL POWER RANGE MONITOR EXCHANGE TOOL

(75) Inventors: David P. Ketcham, Charlotte, NC (US); Stafford L. Turner, Ooltewah, TN (US); Brian C. Campbell, Hixson, TN (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 785 days.

(21) Appl. No.: 12/774,895

(22) Filed: May 6, 2010

(65) Prior Publication Data
US 2011/0219609 A1    Sep. 15, 2011

Related U.S. Application Data

(60) Provisional application No. 61/312,789, filed on Mar. 11, 2010.

(51) Int. Cl.
*B23P 19/00* (2006.01)

(52) U.S. Cl.
USPC ............. 29/723; 29/729; 29/705; 376/240; 376/241; 376/450; 376/249; 376/254

(58) Field of Classification Search
USPC ........... 29/723, 729, 705; 376/240, 241, 450, 376/249, 254
See application file for complete search history.

(56) References Cited

U.S. PATENT DOCUMENTS

| | | | |
|---|---|---|---|
| 4,818,471 A | | 4/1989 | Thomson et al. |
| 5,442,665 A | * | 8/1995 | Dalke ........................... 376/245 |
| 5,793,829 A | * | 8/1998 | Bacso et al. .................. 376/292 |
| 5,802,127 A | | 9/1998 | Goldberg |
| 5,878,099 A | | 3/1999 | Burrows et al. |
| 5,930,317 A | | 7/1999 | Kono |
| 6,633,622 B2 | | 10/2003 | Kuribayashi et al. |
| 6,744,840 B2 | | 6/2004 | Karino et al. |
| 2003/0128791 A1 | * | 7/2003 | Martin et al. .................. 376/204 |

* cited by examiner

*Primary Examiner* — Peter DungBa Vo
*Assistant Examiner* — Jeffrey T Carley
(74) *Attorney, Agent, or Firm* — Richard J. Coldren; Westinghouse Electric Company LLC (57) ABSTRACT

A tool for use in servicing an LPRM assembly of a nuclear reactor vessel includes a structural member having a first bore that is structured to receive an LPRM device associated with the LPRM assembly, a headpiece provided at a first end of the structural member, and a nut engaging assembly slideably mounted on the structural member. The headpiece has a plurality of projections structured to mate with a plurality of bores provided in a seal of the LPRM assembly to enable the seal to be removed, and the nut engaging assembly has a housing that defines a second bore and that has first and second nut engaging portions. The nut engaging assembly is free to slide along the structural member and over the headpiece to a position wherein the engaging portions extend beyond the headpiece so that they may be used to remove the assembly nut.

14 Claims, 12 Drawing Sheets

FIG. 16

UNDER VESSEL LOCAL POWER RANGE MONITOR EXCHANGE TOOL

CROSS-REFERENCE TO RELATED APPLICATIONS

This application claims priority under 35 U.S.C. §119(e) from U.S. Provisional Application No. 61/312,789, entitled "Under Vessel LPRM Exchange Support Tool", filed on Mar. 11, 2010, the disclosure of which is incorporated herein by reference.

BACKGROUND OF THE INVENTION

1. Field of the Invention

The present invention relates nuclear reactor vessels, and in particular to a tool that may be used to simplify and facilitate the removal and replacement of a Local Power Range Monitor (LPRM) in a nuclear reactor vessel.

2. Related Art

Local Power Range Monitors (LPRMs) are used in nuclear reactor vessels to monitor the power output of nuclear fuel which is a direct indication of the amount of power that the nuclear power plant is producing. LPRMs are a vital part of nuclear reactor function and need to be replaced from time to time. Typical LPRMs are approx 60 ft long and each include a number of axially spaced neutron detectors. LPRMs extend within a vessel incore housing from an LPRM assembly flange that is located under the reactor vessel where they are secured in place up through the fuel core of the reactor and to the reactor top guide.

Before an LPRM can be exchanged, it must be disconnected from its vessel incore housing from a position under the reactor vessel. The LPRM exchange process first requires an under vessel team to go under the reactor vessel and remove an LPRM assembly seal and an LPRM assembly nut that are coupled to the LPRM assembly flange and that secure the LPRM in place in order to free the LPRM from its vessel incore housing. Once this is accomplished, a refuel floor team pulls the LPRM from the reactor core for disposal. The refuel floor team will then install the new LPRM and the under vessel team will reinstall the LPRM assembly nut and LPRM assembly seal, thus securing the new LPRM in place.

Currently, three tools must be carried to the under vessel area in order to free the LPRM as just described. Those tools includes one tool for removing the seal and two different tools for removing the nut. Two tools must be taken for the nut because two different size nuts can be used on an LPRM assembly and it is typically not known in advance which size nut is installed on any particular LPRM assembly. The actual nut size cannot be determined until the team tries to put a tool on the nut.

There is thus room for improvement in the area of removal and replacement of a LPRMs in nuclear reactor vessels. In particular, there is a need for a tool that simplifies and facilitates the removal and replacement of LPRMs in nuclear reactor vessels.

SUMMARY OF THE INVENTION

A tool for use in servicing an LPRM assembly of a nuclear reactor vessel is provided that includes a structural member having a first bore that is structured to receive an LPRM device associated with the LPRM assembly, a headpiece provided at a first end of the structural member, and a nut engaging assembly slideably mounted on the structural member. The headpiece has a plurality of projections (e.g., screws) structured to mate with a plurality of bores provided in a seal of the LPRM assembly to enable the seal to be removed, and the nut engaging assembly has a housing that defines a second bore and that has a first nut engaging portion (e.g., a hex cut portion) and a second nut engaging portion (e.g., another hex cut portion) smaller than the first nut engaging portion. The nut engaging assembly is free to slide along the structural member and over the headpiece to a position wherein the first and second nut engaging portions extend beyond the headpiece so that they may be used to remove the assembly nut.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

A further understanding of the invention can be gained from the following description of the preferred embodiments when read in conjunction with accompanying drawings in which.

DESCRIPTION OF THE PREFERRED EMBODIMENT

Directional phrases used herein, such as, for example and without limitation, top, bottom, left, right, upper, lower, front, back, and derivatives thereof, relate to the orientation of the elements shown in the drawings and are not limiting upon the claims unless expressly recited therein.

As employed, herein, the statement that two or more parts or components are "coupled" together shall mean that the parts are joined or operate together either directly or through one or more intermediate parts or components.

As employed herein, the statement that two or more parts or components "engage" one another shall mean that the parts exert a force against one another either directly or through one or more intermediate parts or components.

As employed herein, the term "number" shall mean one or an integer greater than one (i.e., a plurality).

Figure 1:
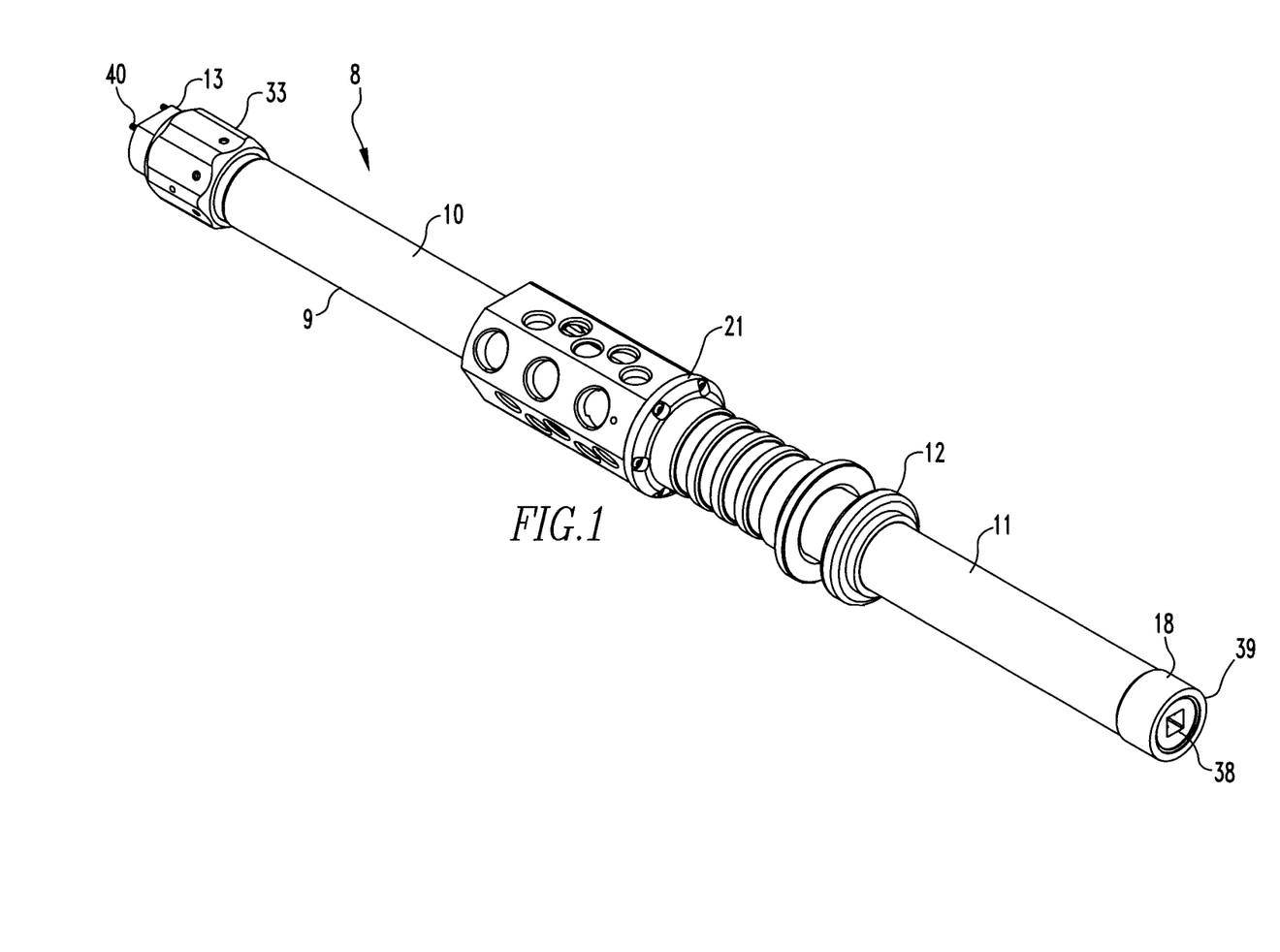
FIG. 1 is an isometric view of a tool that may be used to remove the assembly seal and assembly nut of an LPRM (Local Power Range Monitor) assembly of a nuclear reactor vessel according to an exemplary embodiment of the present invention.
Figures 2, 3:
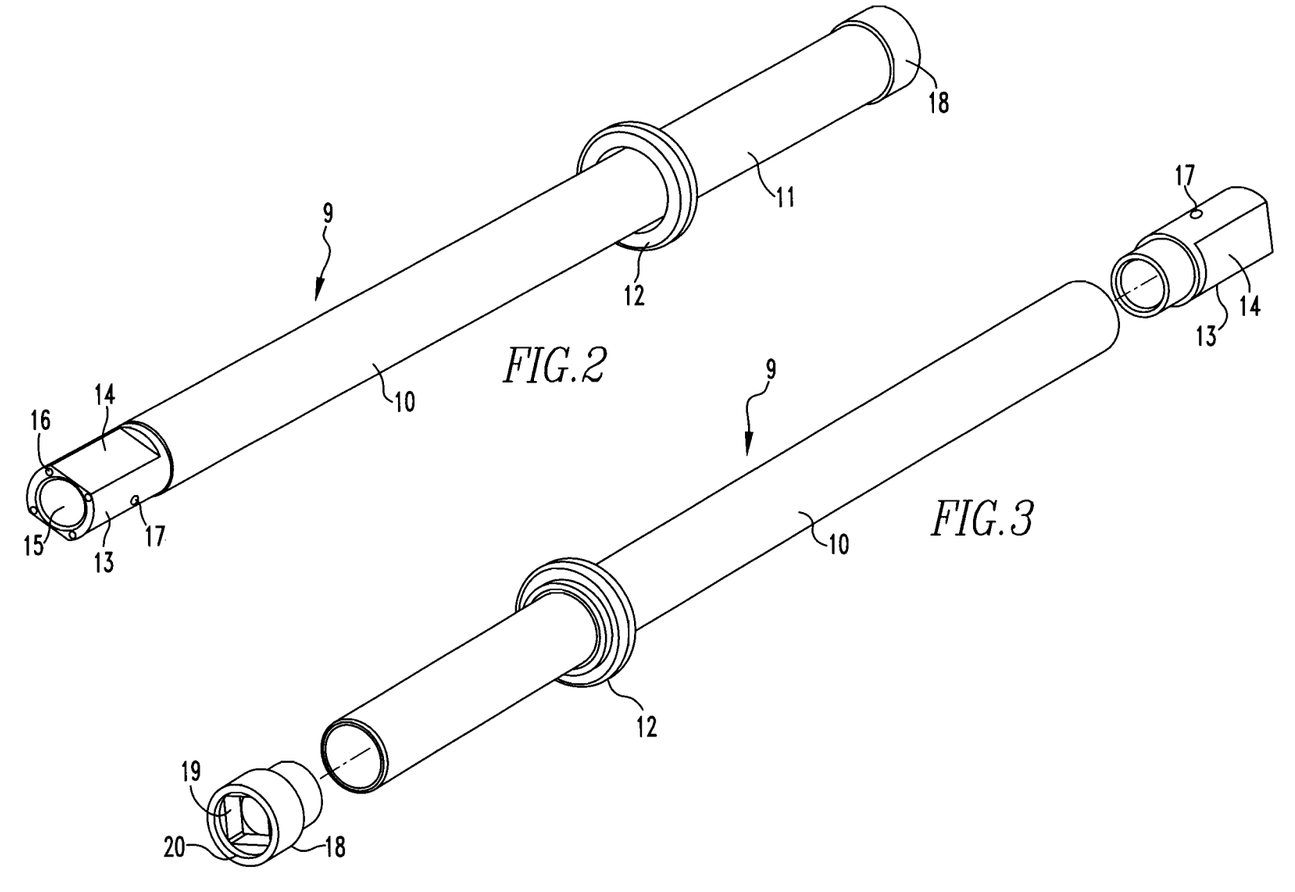
FIGS. 2 and 3 are isometric and exploded views, respectively, of a weldment forming a part of the tool shown in FIG. 1.

FIG. 1 is an isometric view of tool 8 that may be used to remove and replace the assembly seal and assembly nut of an LPRM (Local Power Range Monitor) assembly of a nuclear reactor vessel according to an exemplary embodiment of the present invention. Tool 8 includes weldment 9. A front isometric view of weldment 9 is shown in FIG. 2 and an exploded rear view of weldment 9 is shown in FIG. 3. Weldment 9 includes structural tube 10 having knurled portion 11 provided at a rear end thereof. Flange 12 is welded above knurled portion 11.

Figure 4:
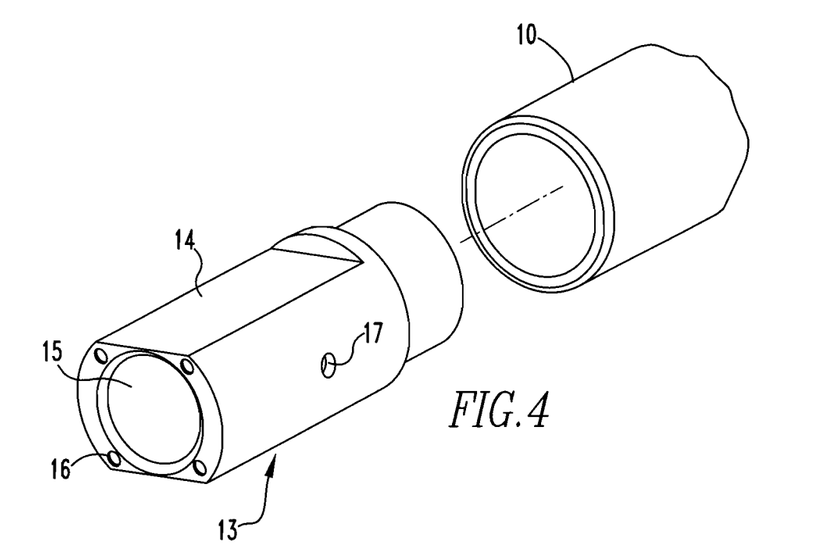
FIG. 4 is an enlarged view of a head piece forming a part of the weldment of FIGS. 2 and 3.

Head piece 13 is provided at a top end of weldment 9 where it is affixed to a top end of structural tube 10 (opposite flange 12). An enlarged view of head piece 13 is shown in FIG. 4. Head piece 13 includes of two flat surfaces 14 located on opposite sides thereof, thru hole 15 extending longitudinally therethrough, four tapped holes 16 having helicoils (i.e., threaded inserts) on a front face thereof, and two drilled holes 17 on opposite sides thereof. In the exemplary embodiment, head piece 13 is welded to the top end of structural tube 10.

Figure 5:
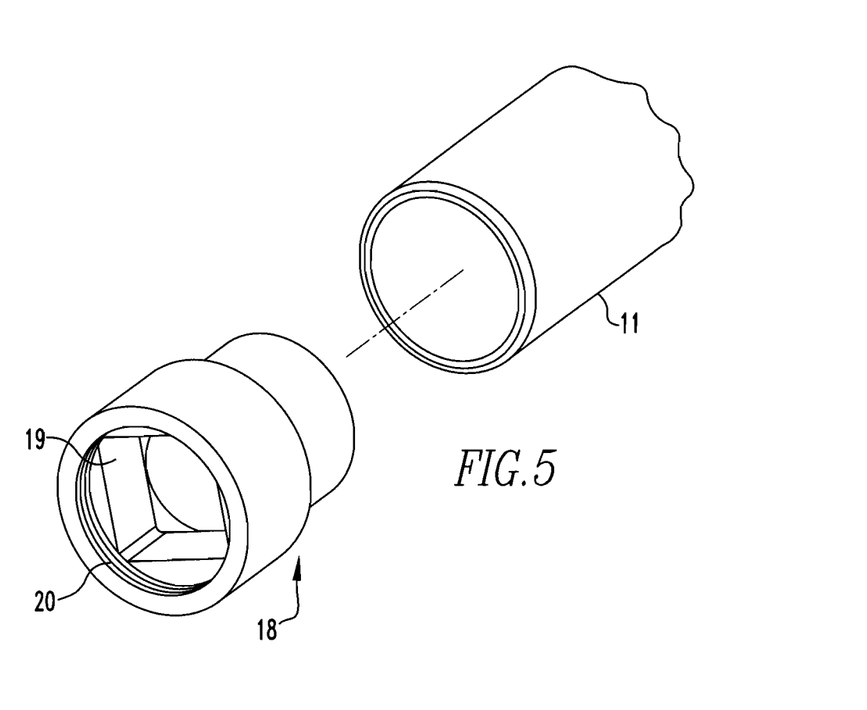
FIG. 5 is an enlarged view of a housing forming a part of the weldment of FIGS. 2 and 3.

Housing 18 is provided at a bottom end of weldment 9 where it is affixed to the end of knurled portion 11 that is opposite flange 12. In the exemplary embodiment, housing 18 is welded to the end of knurled portion 11. An enlarged view of housing 18 is shown in FIG. 5. Housing 18 includes internal square cut 19 and circular cut 20.

Figure 6:
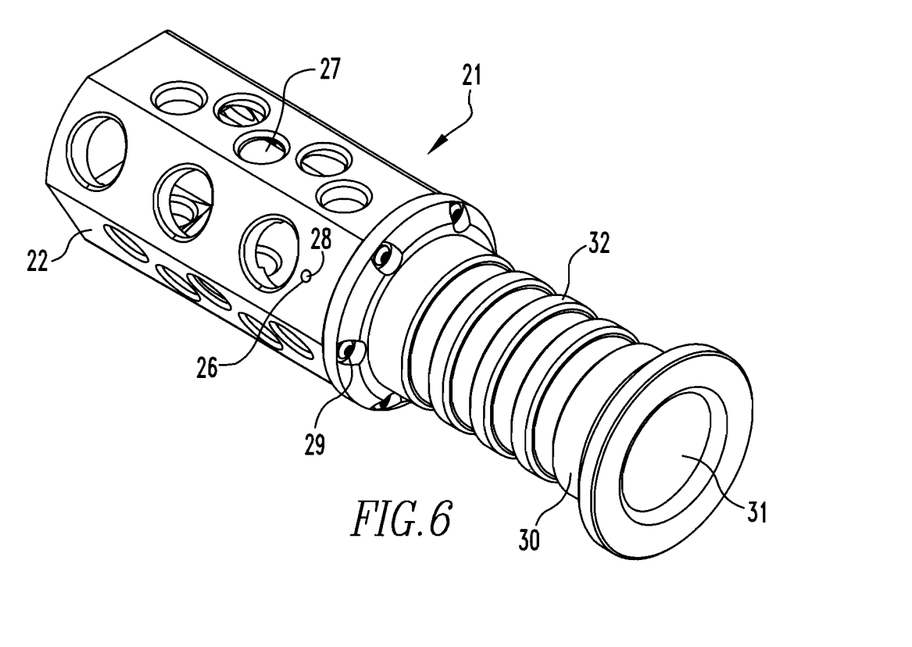
FIG. 6 is an isometric view a nut removal assembly forming a part of the tool shown in FIG. 1.
Figure 7:
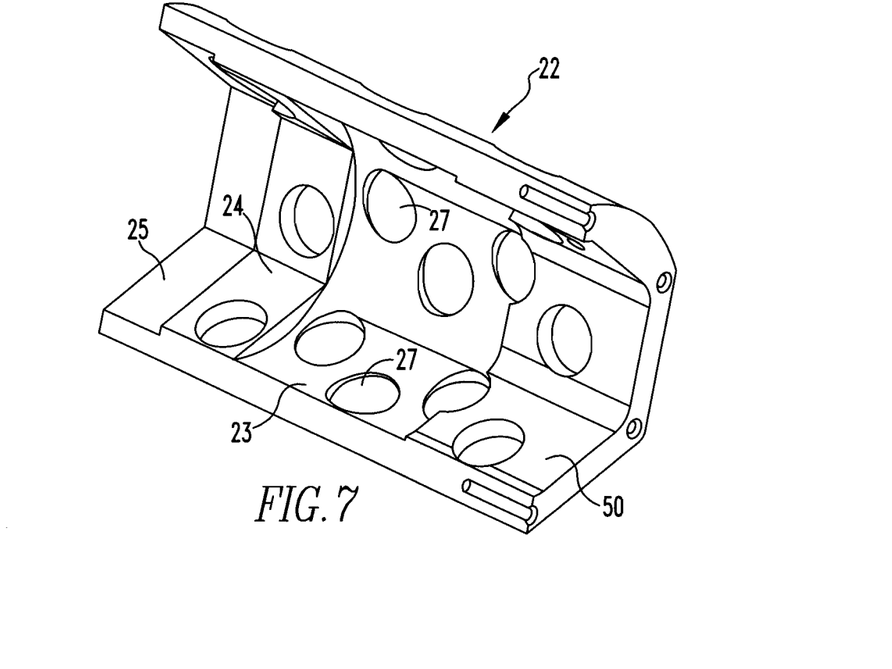
FIG. 7 is a cut-away view of a nut removal housing forming a part of the nut removal assembly of FIG. 6.

Tool 8 further includes nut removal assembly 21 that is inserted over and is slideable along weldment 9 (above flange 12). FIG. 6 is an isometric view of nut removal assembly 21. Nut removal assembly 21 includes nut removal housing 22. A cut-away view of nut removal housing 22 is shown in FIG. 7. As seen in FIG. 7, nut removal housing 22 includes inner bore 23, first hex cut portion 24 for LPRM assembly nuts of a first size (e.g., 2 inch LPRM assembly nuts), and second hex cut portion 25 adjacent to first hex cut portion 24 for LPRM assembly nuts of a second size (e.g., 2⅛ inch LPRM assembly nuts). Nut removal housing 22 also includes two threaded thru holes 26 on opposite sides thereof, lightening holes 27, and ball spring plungers 28 received within threaded thru holes 26. In addition, handle 30 having thru hole 31 and gripping grooves 32 is attached to nut removal housing 22 with by screws 29.

Figure 8:
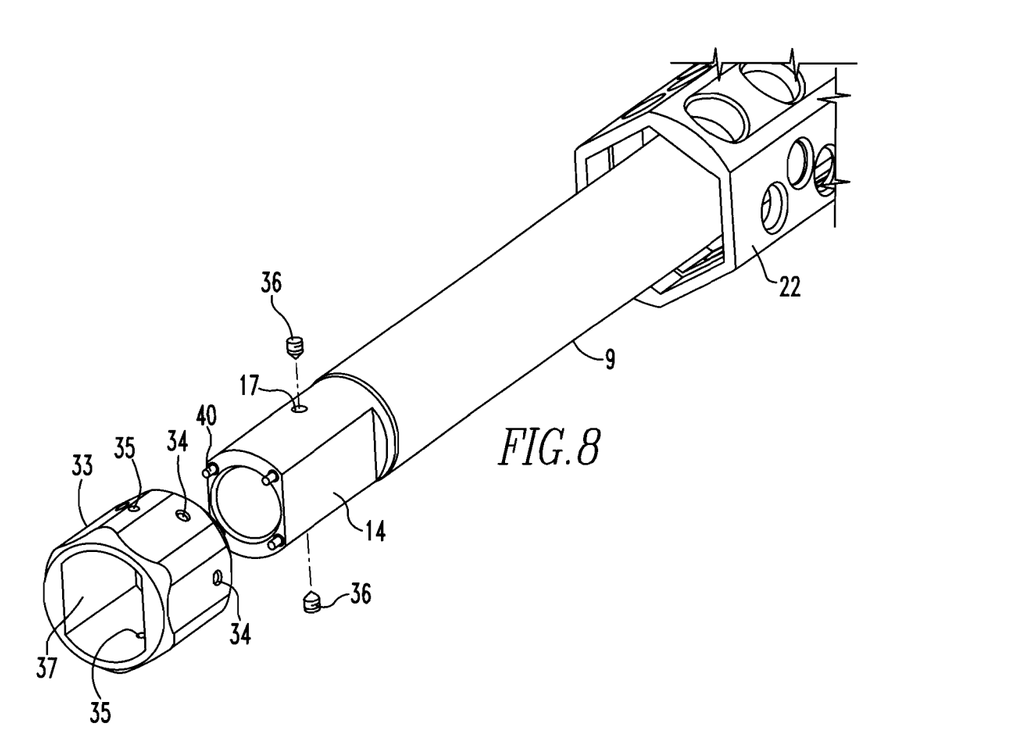
FIG. 8 is an exploded view of the top portion of the tool shown in FIG. 1 showing a hex collar that forms a part thereof.
Figure 9:
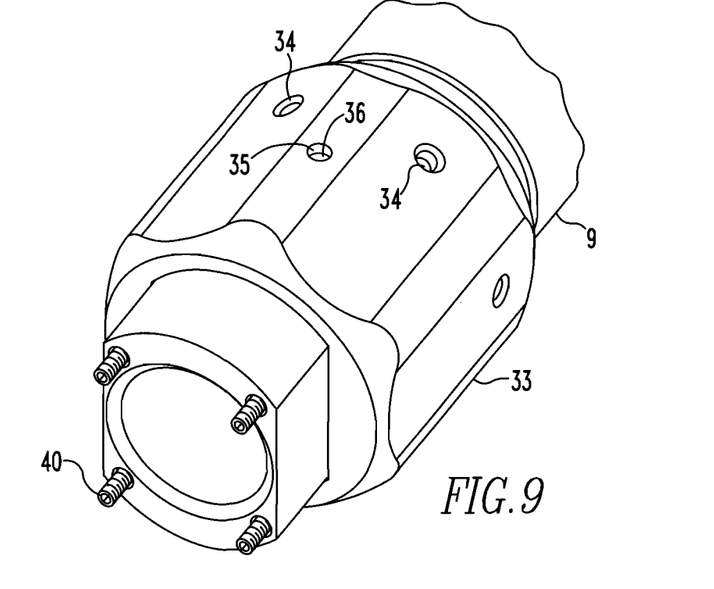
FIG. 9 is an isometric view of the top portion of tool shown in FIG. 1 showing the hex collar affixed to the head piece of the tool.

FIGS. 8 and 9 are a partially exploded view and an isometric view, respectively, of the top portion of tool 8. As seen in FIGS. 8 and 9, hex collar 33 is attached to the top end of weldment 9 by inserting hex collar 33 over head piece 13. Hex collar 33 includes six recessed bores 34 and two threaded holes 35 (on opposite sides thereof). Hex collar 33 is held in place linearly on head piece 13 with set screws 36 that are received within drilled holes 17 of head piece 13 through threaded holes 35. Pins or another form of projection member could be used in place of set screws 36. Two internal flat sections 37 of hex collar 33 keep hex collar 33 from rotating relative to head piece 13 by aligning with and engaging flat surfaces 14 located on opposite sides of head piece 13.

Figure 10:
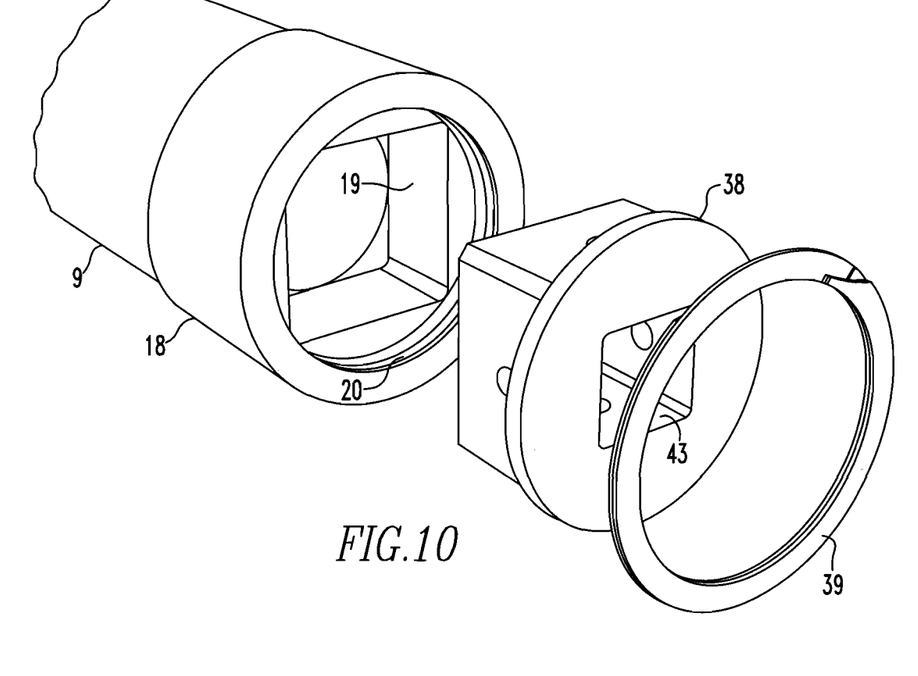
FIG. 10 is an exploded view of the bottom end of the tool shown in FIG. 1 that shows a torque nut forming a part of the tool.

FIG. 10 is an exploded view of the bottom end of tool 8 As seen in FIG. 10, torque nut 38 is inserted into housing 18 that is provided at the bottom end of weldment 9. Torque nut 38 includes thru square cut portion 43 and is held in place within housing 18 by spiral ring 39 installed into circular cut 20 of housing 18. Torque nut 38 is prevented from rotating within housing 18 by engaging square cut 19.

Finally, referring again to FIG. 9, four set screws 40 are provided in the four tapped holes 16 of the head piece 13 described elsewhere herein.

Figure 11:
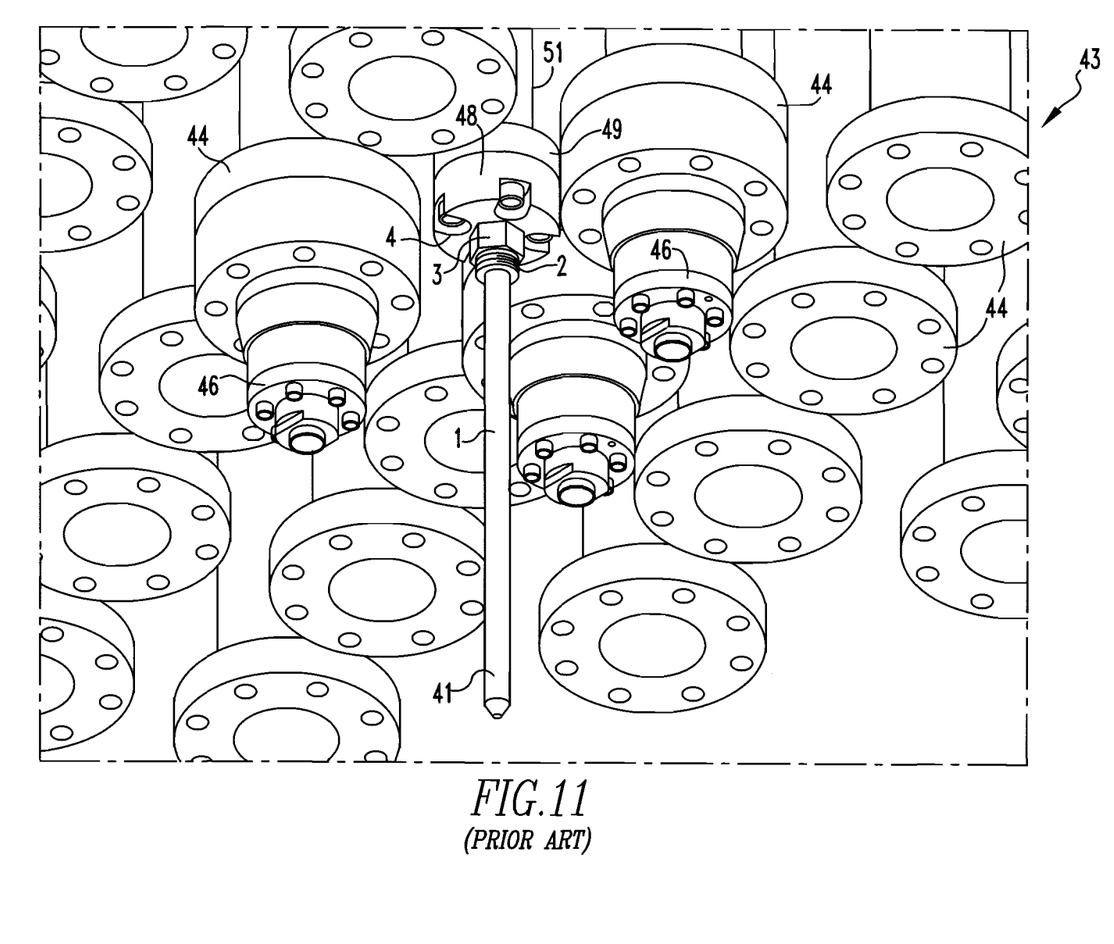
FIG. 11 is a schematic view of a portion of the area under a known reactor vessel.

In order to describe how tool 8 is used for LPRM removal and replacement, selected well known components of the under vessel area 43 of a nuclear reactor will be described in connection with FIG. 11. As is known in the art, under vessel area 43 includes a number of control rod drive housings 44, a number of control rod drive assemblies 46, and a number of LPRM (Local Power Range Monitor) assemblies 48. Each LPRM assembly 48 includes elongated LPRM device 1 having a plurality of axially spaced neutron detectors. LPRM device 1 is secured in place within LPRM assembly 48 by LPRM assembly seal 2 and LPRM assembly nut 3 of LPRM assembly 48 which are coupled to LPRM assembly flange 4 of LPRM assembly 48. LPRM assembly flange 4 is bolted to LPRM housing flange 49 forming part of an LPRM housing 51 that is welded to the reactor vessel.

Figure 12:
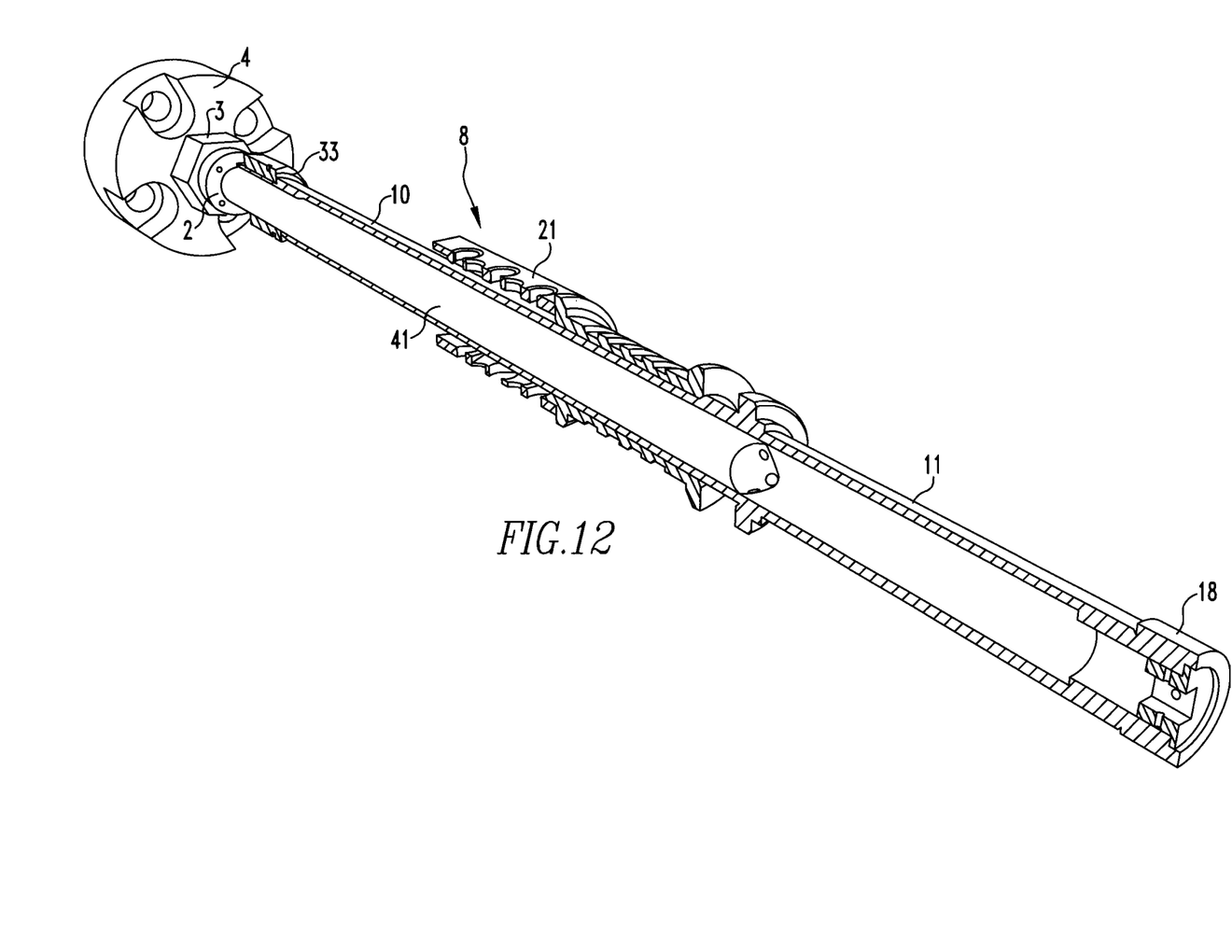
FIG. 12-14 are schematic views of the tool shown in FIG. 1 being used to remove an LPRM assembly seal.
Figure 13:
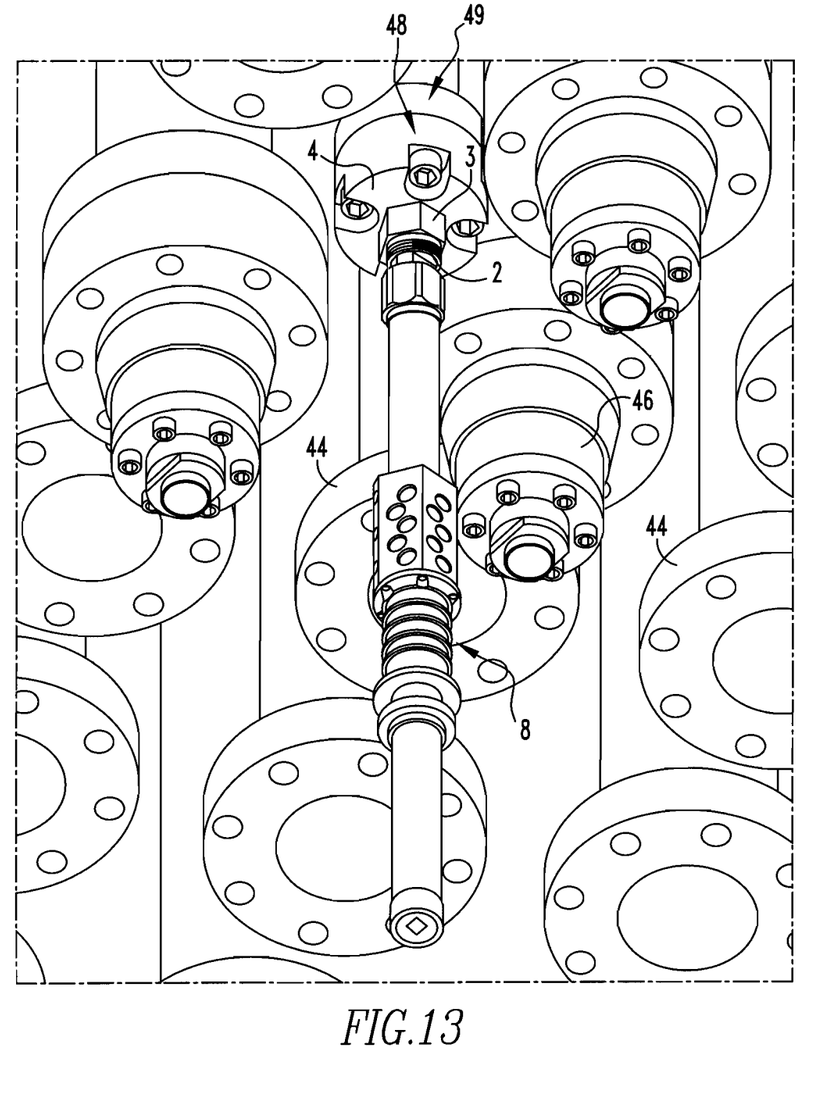
Figure 14:
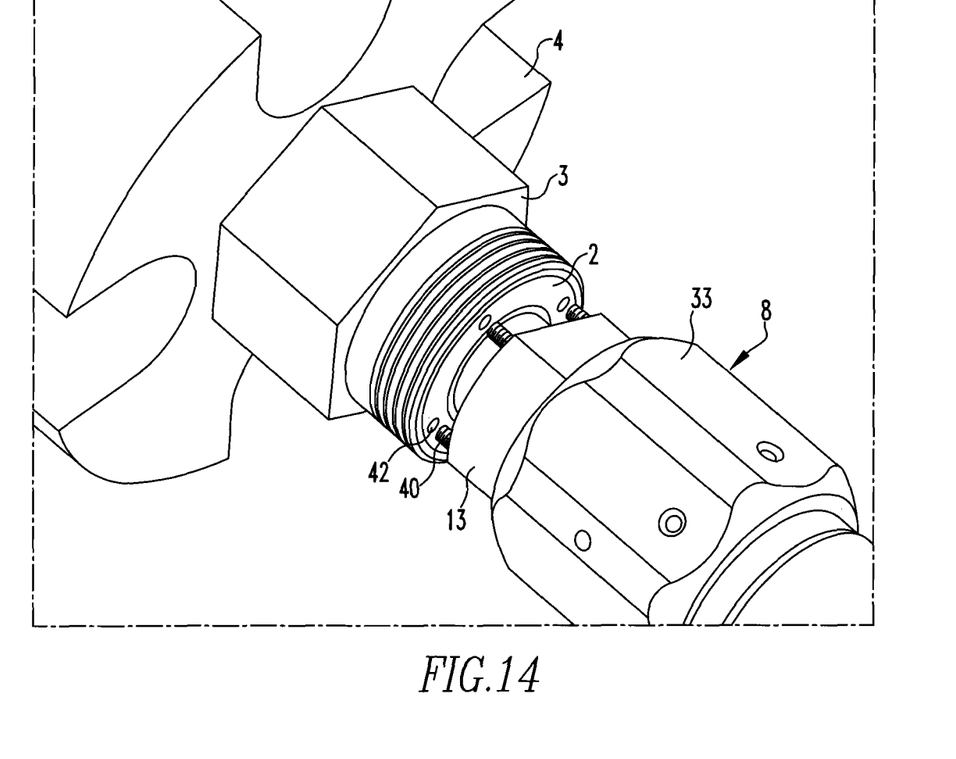

To remove LPRM assembly seal 2, tool 8 is configured with nut removal assembly 21 resting on or adjacent to flange 12. Tool 8 is then inserted over the LPRM assembly nose piece 41 as shown in FIG. 12 and raised up until the four sets screws 40 mate into the four counter bores 42 of LPRM assembly seal 2 (See FIGS. 13-14). Tool 8 is then rotated counter clockwise, thereby unthreading and removing LPRM assembly seal 2.

Figure 15:
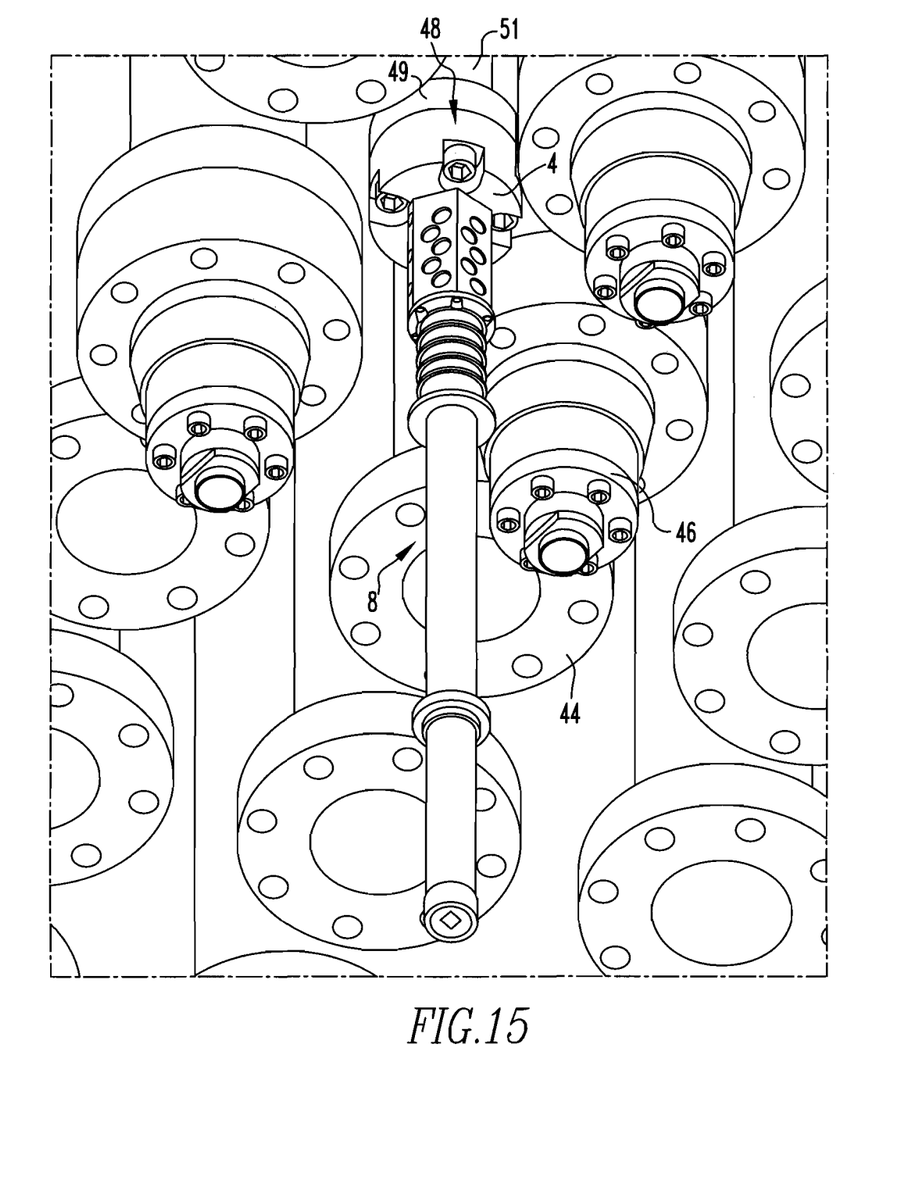
FIG. 15-16 are schematic views of the tool shown in FIG. 1 being used to remove an LPRM assembly nut.
Figure 16:
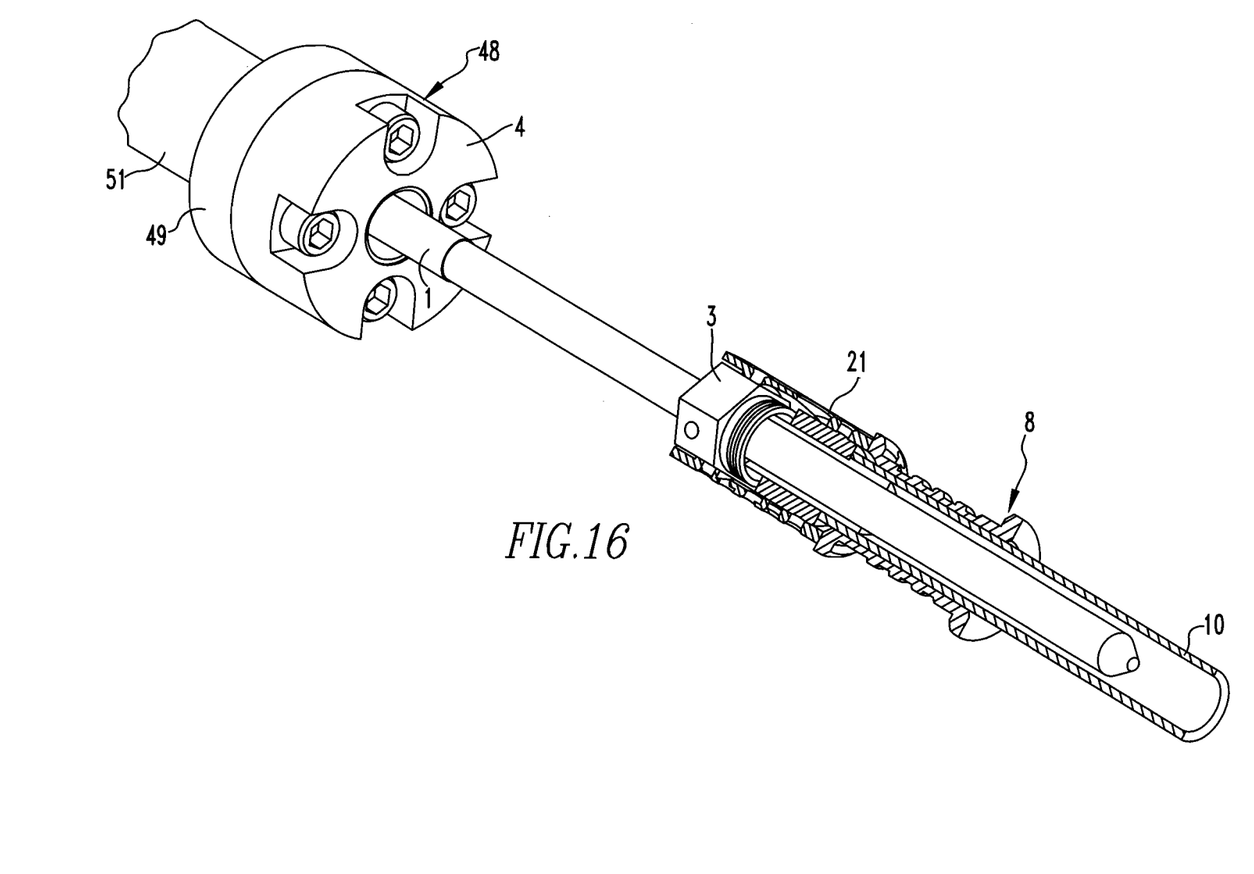

To remove LPRM assembly nut 3, tool 8 is configured so that nut removal assembly 21 is raised up and over hex collar 33, engaging the two ball spring plungers 28 of nut removal assembly 21 into two of the six recessed bores 34 of hex collar 33, thereby holding nut removal assembly 21 in place. Nut removal assembly 21 is prevented from rotating on tool 8 by the fit between the hex cut 50 of nut removal housing 22 and hex collar 33. In addition, nut removal housing 22 is kept from sliding off of tool 8 by handle 30 of nut removal assembly 21 due to the fact that the thru hole 31 in handle 30 of nut removal assembly 21 is too small to fit over hex collar 33. Tool 8 is then inserted over LPRM assembly nose piece 41 and raised up until the appropriate hex cut portion 24, 25 (i.e., the one that fits) of nut removal assembly 21 engages with LPRM assembly nut 3 as shown in FIG. 15. Tool 8 is then rotated counter clockwise until LPRM assembly nut 3 is released and can be removed from LPRM assembly 48 (see FIG. 16).

If needed, a wrench or breaker bar can be attached to torque nut 38 of tool 8 to break loose LPRM assembly seal 2 and/or LPRM nut 3. LPRM device 1 is then free to be removed from LPRM assembly 48 and replaced.

After a new LPRM device 1 is inserted into LPRM assembly 48, LPRM assembly nut 3 is re-installed using nut removal assembly 21 (the reverse of the process described above is employed). Preferably, a torque wrench is attached to torque nut 38 of tool 8 and LPRM assembly nut 3 is torqued to required specifications. Next, nut removal assembly 21 is moved down against flange 12 and LPRM assembly seal 2 is re-installed utilizing head piece 13 (again using the reverse of the process described above). At that point, the LPRM exchange process is completed.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the breath of the appended claims and any and all equivalents thereof.

What is claimed is:

1. A tool for use in servicing Local Power Range Monitor assembly of a nuclear reactor vessel, comprising:
 a structural member having a first bore, the first bore when in use, receives a Local Power Range Monitor device associated with the Local Power Range assembly;
 a headpiece provided at a first end of the structural member, the headpiece having a plurality of projections, said projections when in use, fittingly engage with a plurality of bores provided in a seal of the Local Power Range Monitor assembly; and
 a nut engaging assembly slideably mounted on the structural member, the nut engaging assembly having a housing defining a second bore, the housing having a first nut engaging portion and a second nut engaging portion smaller than the first nut engaging portion, the nut engaging assembly being free to slide along the structural member and over the headpiece to a position wherein the first and second nut engaging portions extend beyond the headpiece.

2. The tool according to claim 1, wherein the first nut engaging portion is a first hex cut portion and the second nut engaging portion is a second hex cut portion smaller than the first hex cut portion.

3. The tool according to claim 1, wherein the projections of the headpiece each comprise a set screw or a pin.

4. The tool according to claim 1, wherein the nut engaging assembly further includes a handle portion coupled to the housing, the handle portion having a third bore aligned with the second bore, the third bore being smaller than the second bore.

5. The tool according to claim 4, further comprising a collar coupled to the head piece, wherein the housing is structured to engage the collar and prevent rotation of the nut engaging assembly relative to the collar.

6. The tool according to claim 5, wherein the collar has a plurality of flat sections on an outer surface thereof and wherein the housing has a hex shaped portion structured to engage the flat sections.

7. The tool according to claim 5, wherein the third bore is smaller than an outer dimension of the collar to prevent the handle portion from sliding over the collar.

8. The tool according to claim 5, wherein the housing includes a plurality of ball spring plungers, wherein the collar has a plurality of recessed bores, and wherein each ball spring plunger is structured to be received within a respective one of the recessed bores when the housing slides over and engages the collar.

9. The tool according to claim 1, the structural member having a gripping portion provided at a second end of the structural member opposite the first end.

10. The tool according to claim 9, further comprising a flange portion coupled to the structural member at a first location, wherein the nut engaging assembly is structured to engage the flange and prevent the nut engaging assembly from sliding past the first location.

11. The tool according to claim 9, further comprising a torqueable nut provided at an end of the gripping portion.

12. The tool according to claim 11, wherein the torque nut is provided in a second housing coupled to the end of the gripping portion.

13. The tool according to claim 12, wherein the structural member, the head piece, the flange and the second housing are part of a weldment.

14. The tool according to claim 5, wherein the head piece has first and second external flat sections, wherein the collar fits over and surrounds the head piece and has third and fourth internal flat sections which engage the first and second flat sections, respectively, and prevent the collar from rotating relative to the head piece.

* * * * *